United States Patent [19]

Jefferson

[11] Patent Number: 5,355,117
[45] Date of Patent: Oct. 11, 1994

[54] VEHICLE WARNING SIGN

[76] Inventor: Len B. Jefferson, 1160 JoAnne St., Apt. No. 109, Jackson, Miss. 39204

[21] Appl. No.: 978,357

[22] Filed: Nov. 18, 1992

[51] Int. Cl.[5] .............................................. B60Q 1/00
[52] U.S. Cl. .............................. 340/425.5; 340/490; 340/433; 292/67; 40/591; 248/222.1; 16/280
[58] Field of Search ............... 340/425.5, 480, 490, 340/487, 433; 292/63, 67, 207, 194, 200, 203, 205; D8/354; 248/466, 222.1; 40/591, 589; 16/280; D19/52

[56] References Cited

U.S. PATENT DOCUMENTS

| | | | |
|---|---|---|---|
| 1,386,671 | 8/1921 | Zych | 292/207 |
| 2,144,813 | 1/1939 | Roan et al. | 340/433 |
| 2,252,529 | 8/1941 | Simpkins et al. | 340/433 |
| 2,384,689 | 9/1945 | Moore | 340/433 |
| 2,920,309 | 1/1960 | Fultz | 340/433 |
| 3,094,683 | 6/1963 | Watkins | 340/433 |
| 3,133,265 | 5/1964 | Fultz | 340/433 |
| 3,715,778 | 2/1973 | Wilson | 16/180 |
| 3,715,821 | 2/1973 | Hawes . | |
| 3,802,103 | 4/1974 | Neff | 40/129 C |
| 3,975,848 | 3/1976 | Tuleja . | |
| 4,138,668 | 2/1979 | Latta | 340/433 |
| 4,325,318 | 4/1982 | Kitrell | 248/293 |
| 4,559,518 | 12/1985 | Latta . | |
| 4,766,413 | 8/1988 | Reavell . | |
| 4,816,804 | 3/1989 | Reavell . | |
| 4,825,192 | 4/1989 | Wells . | |
| 4,956,630 | 2/1990 | Wicker . | |
| 4,983,949 | 1/1991 | Wicker | 340/433 |
| 5,038,136 | 8/1991 | Watson | 340/433 |

*Primary Examiner*—John K. Peng
*Assistant Examiner*—Nina Tong
*Attorney, Agent, or Firm*—Richard C. Litman

[57] ABSTRACT

A warning sign hinge-mounted on the side of a vehicle, for warning motorists against blocking access, as by parking in close proximity, of a wheelchair to a wheelchair lift aboard the vehicle. The sign includes warning indicia and reflectors, and has a distinctive shape. The sign is manually latched to the vehicle side when not in service, and manually released for deployment. Springs urge the sign into the deployed position perpendicular to the vehicle side when not latched in the stowed position.

2 Claims, 3 Drawing Sheets

VEHICLE WARNING SIGN

BACKGROUND OF THE INVENTION

1. Field of the Invention

The present invention relates to a warning sign which is pivotally mounted on the side of a vehicle.

2. Description of the Prior Art

Retractable warning signs mountable on vehicles are well known, as exemplified by signs and barriers provided on school busses. Exemplary are U.S. Pat. Nos. 4,559,518, issued to Joseph E. Latta on Dec. 17, 1985; 4,766,413 and 4,816,804, both issued to James Reavell on Aug. 23, 1988 and Mar. 28, 1989, respectively; and 4,956,630, issued to James H. Wicker on Sep. 11, 1990. The respective signs or barriers are electrically extended and retracted, swinging out from a stowed position against the side of the school bus.

U.S. Pat. No. 3,715,821, issued to Edward L. Hawes on Feb. 13, 1973, discloses a purely mechanical sign suspended from the side of a vehicle, a sign panel rotating about a vertical axis.

U.S. Pat. No. 3,975,849, issued to Anthony Z. Tuleja on Aug. 24, 1976, discloses a warning sign having reflectors. In U.S. Pat. No. 4,825,192, issued to Kenneth A. Wells on Apr. 25, 1989, reflectors are shown mounted on a warning device extensible from the side of a vehicle.

None of the above inventions and patents, taken either singly or in combination, is seen to describe the instant invention as claimed.

SUMMARY OF THE INVENTION

The present invention provides a purely mechanically operated warning sign hinge mounted on the side of a motor vehicle which swings out to display a warning to others to avoid obstructing access to the vehicle, in particular to warn motorists not to park so close as to block access to the vehicle for a wheelchair. The sign is spring biased to assume a position perpendicular to the vehicle side, and yields in response to an interference, as might be provided by a pedestrian walking into the sign.

The sign has a latch to secure it in a juxtaposed manner to the vehicle side when not being deployed. The latch is manually attached when stowing the sign, and manually released to enable deployment.

Accordingly, it is a principal object of the invention to provide a permanently mounted warning sign pivotally supported on a side of a vehicle, which warning sign is biased to swing towards a deployed position perpendicular to the side of the vehicle.

A second object of the invention is to provide a vehicle warning sign having warning indicia and reflectors thereon.

It is another object of the invention to provide a vehicle warning sign which is manually moved into stowed and deployed positions.

It is a further object of the invention to provide a vehicle warning sign which is manually latched in a stowed position.

Still another object of the invention is to provide a vehicle warning sign which pivots away from an interfering object, thus avoiding injury to a person or damage to the sign upon a person or other object coming into contact with the sign.

An additional object of the invention is to provide a purely mechanical pivoting vehicle warning sign.

Another object of the invention is to provide a vehicle warning sign which is contained exteriorly of the vehicle.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
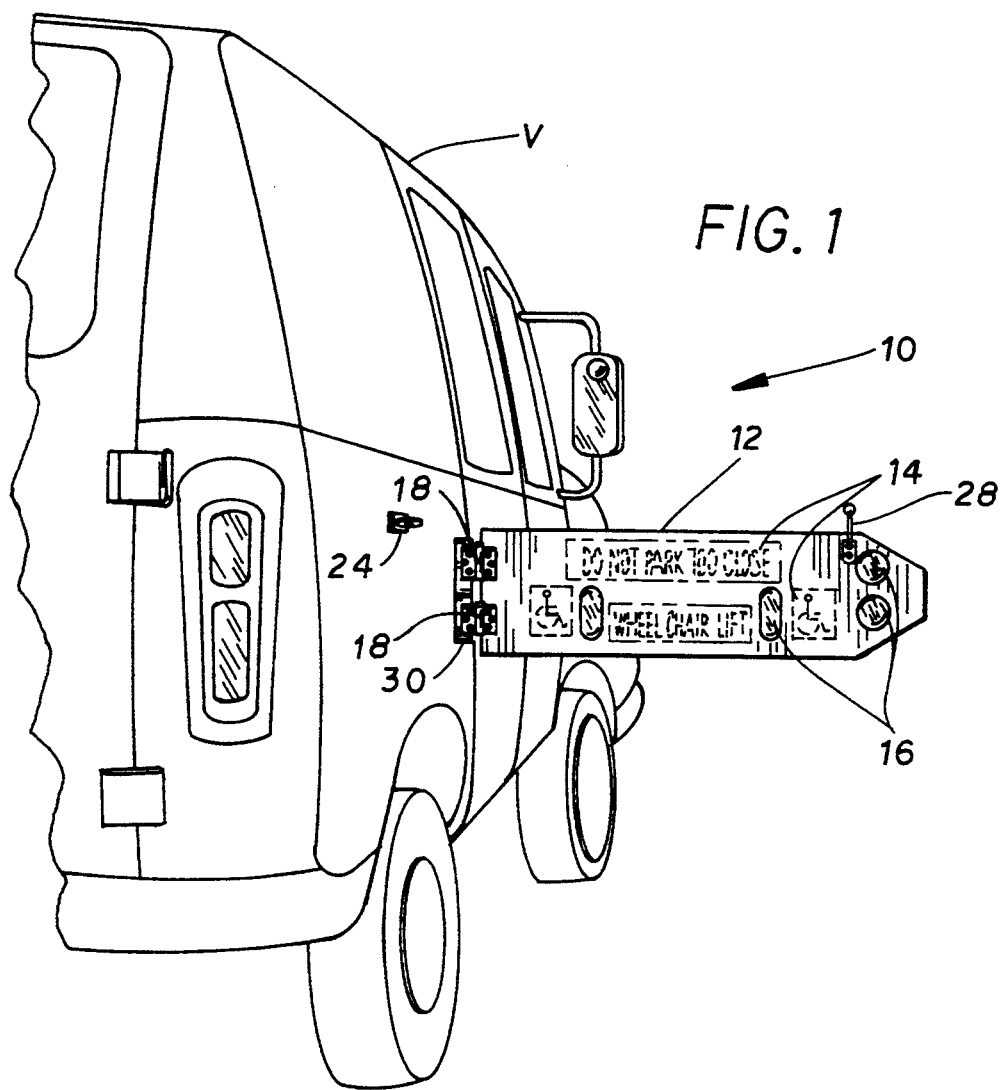
FIG. 1 is an environmental perspective view of the invention in a deployed position.

The present invention, seen in FIG. 1, comprises a warning sign 10 mounted on a side of a motor vehicle V, for warning motorists not to prevent access, as by parking in close proximity, to a wheelchair lift aboard vehicle V. The warning sign 10 includes a sign panel 10 bearing warning indicia 14 and reflectors 16 mounted on front and rear sides thereof, a hinge 18 having springs 20 urging the sign panel 12 into a deployed position perpendicular to the side of the vehicle V, and a latch 24.

Figure 2:
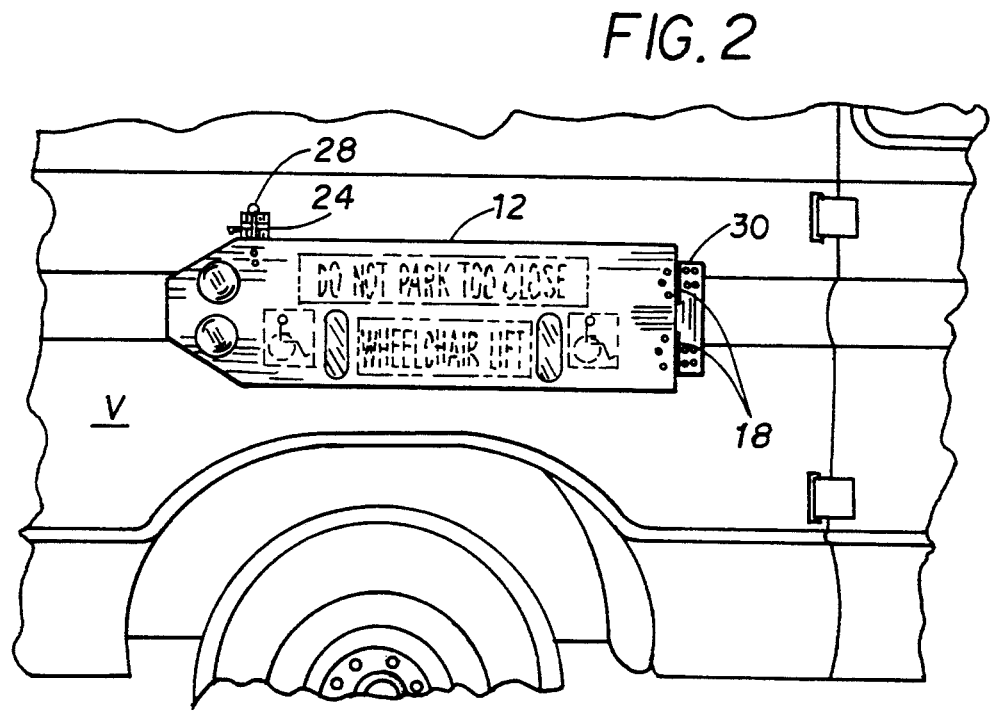
FIG. 2 is an environmental side elevational view of the invention latched in a stowed position.

The sign panel 12 is provided with a distinctive shape to draw attention. Preferably, the shape is rectangular, but with one end tapered. A finger 28 projects upwardly from the sign panel 12 to engage the latch 24. The sign panel 12 is mounted on hinge 18 such that the sign panel 12 pivots from a stowed position parallel to and adjacent the vehicle side (see FIG. 2) to and beyond the deployed position. Hinge 18 is a double acting hinge enabling the sign panel 12 to swing to both sides of the perpendicular deployed position providing a safety feature to accommodate an interference, as might be provided by a passerby unmindfully walking into the extended sign panel 12. To protect the passerby, and to preclude damage to the warning sign 10, the sign panel 12 swings out of the way.

Figure 6:
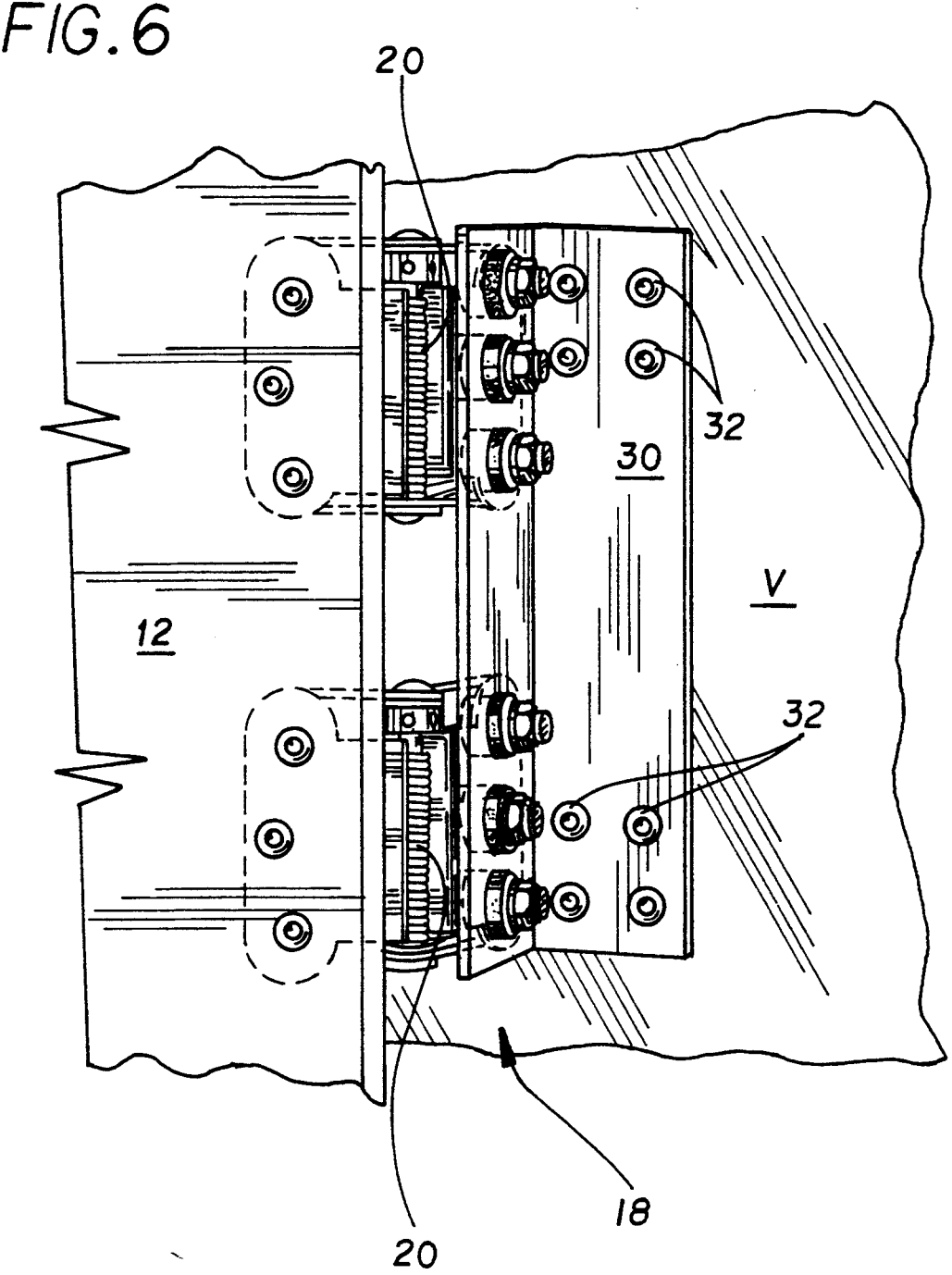
FIG. 6 is a perspective detail view of the hinge.

As seen in FIG. 6, the double acting hinge 18 has well known dual acting springs 20 to urge the sign panel 12 into the perpendicular deployed position. Upon being released from the latch 24 which holds the sign panel 12 in the stowed position, the springs 20 will cause the sign panel 12 to swing into the deployed position. Similarly, springs 20 return the sign panel 12 to the deployed position after displacement by a passerby, strong wind, or other forces moving the sign panel 12 from the perpendicular position.

The hinge 18 is secured to an L-shaped bracket 30 anchored to the vehicle side, as by rivets 32. Thus, no linkage or other member penetrates to the inside of vehicle V.

Figure 3:
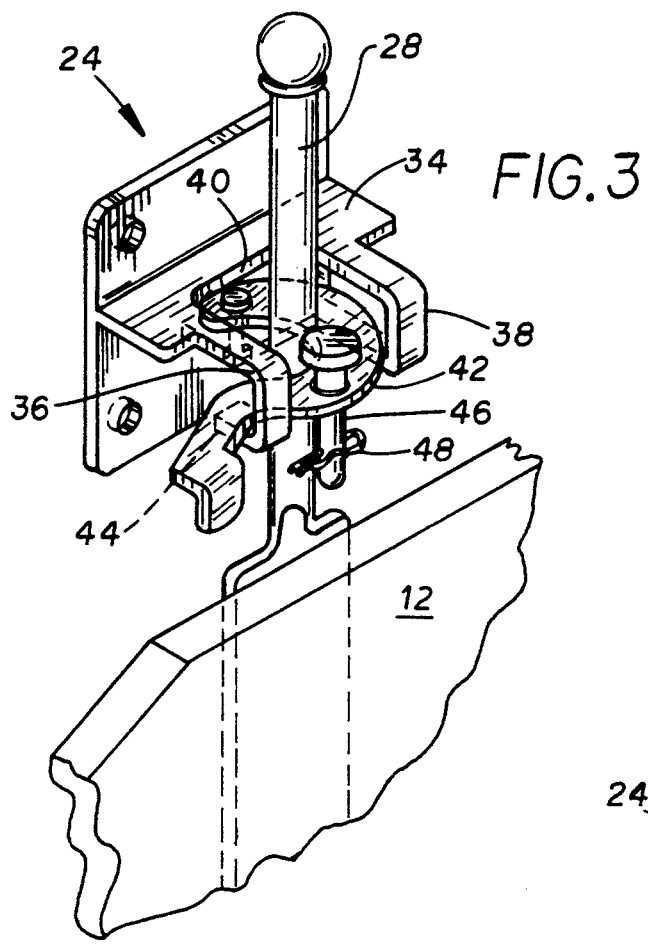
FIG. 3 is a perspective detail view of the latch engaging and securing the movable latch projection.
Figure 4:
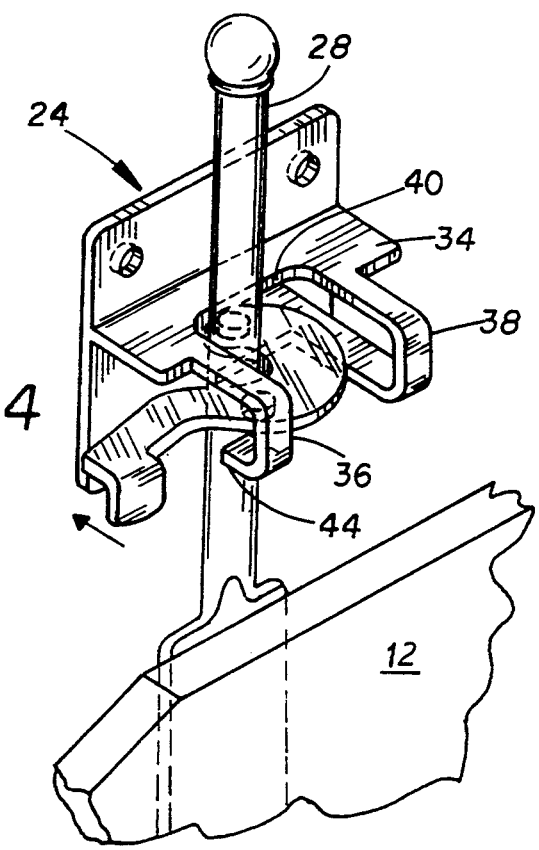
FIG. 4 is a perspective detail view of a latch pivot arm being moved partially to release the latch projection.
Figure 5:
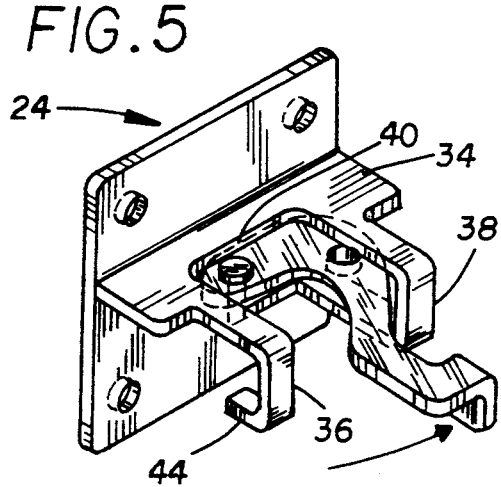
FIG. 5 is a perspective detail view of a latch pivot arm fully moved to release the latch projection.

Turning now to FIG. 3, the latch 24 is seen to secure the sign panel 12 in the stowed position by entrapping finger 28. In the latched position, finger 28 is partially surrounded on three sides by a latch bracket 34 having two lateral projections 36, 38 and a rear wall 40. Latch pivot arm 42 blocks finger 28 from swinging out the open end of the bracket 34. To deploy the sign panel 12, latch pivot arm 42 is pivoted forwardly, as indicated by an arrow in FIG. 4. Latch pivot arm 42 is moved down so as to clear a tang 44 disposed upon lateral projection 36, and then is moved back, counter to the motion shown in FIG. 4. This counter motion is shown in FIG. 5. Obstruction to finger 28 is now removed, and the sign panel 12 is free to swing into the deployed position. While the path negotiated by latch pivot arm 42 is sufficiently indirect as to preclude unintended deployment in ordinary circumstances, a secondary protection is provided by a pin 46. Again turning to FIG. 3, pin 46, secured in place by a resiliently biased clip interferes with latch bracket 34 as latch pivot arm 42 moves forwardly. Pin 46, easily removed by hand, is provided as protection against deployment due to random and possibly forceful motion of the vehicle V while being driven. The sign panel 12 is manually latched in the stowed position by reversing the unlatching procedure.

The instant invention is thus seen to require uncomplicated manual operation for deployment and stowage. The warning sign 10 resists unintended deployment, accommodates periodic interferences during deployment by pivotal displacement, and automatically returns to the deployed position.

It is to be understood that the present invention is not limited to the sole embodiment described above, but encompasses any and all embodiments within the scope of the following claims.

I claim:

1. A vehicle warning sign for swingable mounting on a side of a vehicle, said warning sign comprising:

a sign panel having a latch projection, said sign panel including warning indicia and reflectors disposed upon both sides thereof, said sign panel having a rectangular front and rear shape including a tapered portion extending away from the vehicle when said warning sign is in a deployed position, mounting means anchored to the side of the vehicle, said mounting means including hinge means attached to said sign panel, thus defining a vertical pivot axis, whereby said sign panel is attached to the vehicle so as to pivot to said deployed position substantially perpendicular to the side of the vehicle, and is also pivotable to a stowed position substantially parallel to and adjacent the side of the vehicle, sign positioning means urging said sign panel to pivot to said deployed position, said sign positioning means yielding to a force acting to pivot said sign panel forwardly or backwardly about said pivot axis, said sign positioning means urging said sign panel into said deployed position upon absence of the force, and manual latch means engaging said latch projection when said sign panel is moved into said stowed position, said manual latch means having release pivot arm means requiring a first motion and a counter motion to disengage from said latch projection, said manual latch means also including a removable member immobilizing said release pivot arm means, whereby said release pivot arm means is secured against disengagement upon random motions of the vehicle while the vehicle is moving, said latch removable member further having manually removable resilient retention means, whereby said immobilizing member is secured when operably placed in said latch means.

2. A vehicle warning sign comprising:

a sign panel having a first end and a second end, opposite said first end;

a double acting hinge attached to said first end of said sign panel;

rivets for attaching said double acting hinge to a side of a vehicle;

a latch projection extending from said second end of said sign panel;

a manual latch attachable to a side of said vehicle for selectively engaging and disengaging said latch projection;

warning indicia and reflectors disposed upon both sides of said sign panel of the warning sign;

a tapered portion located at said second end of said vehicle warning sign;

a latch bracket having a rear wall and two lateral projections extending therefrom;

a latch pivot arm attached to a first one of said lateral projections and a lateral projection extending from a second one of said lateral projections; and a tang attached to said second one of said lateral projections, wherein said latch projection extending from said second end of said sign panel is engaged by said manual latch upon moving said latch projection towards said rear wall so as to locate the same between said lateral projections with said latch pivot arm engaging said second one of said lateral projections, and is disengaged from said manual latch upon moving said latch pivot arm in a direction towards said rear wall, then down so as to clear said tang, and then in a direction away from said rear wall.

* * * * *